Aug. 16, 1932.  H. C. WALLACE  1,871,930
TRACTOR MOUNTING FOR GRAIN BLOWERS
Filed May 13, 1929
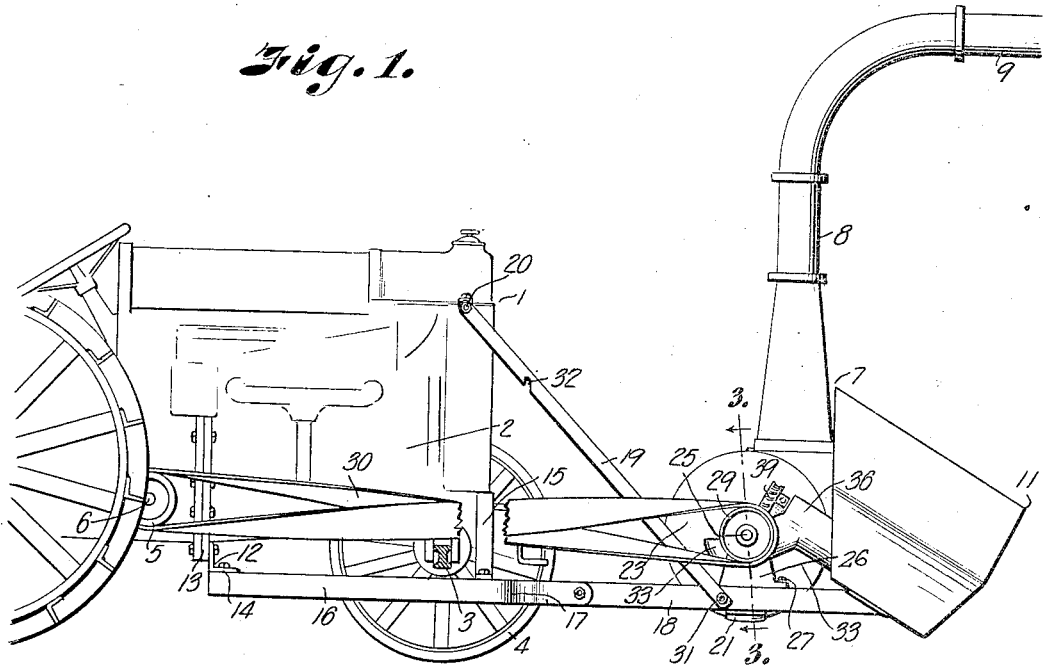
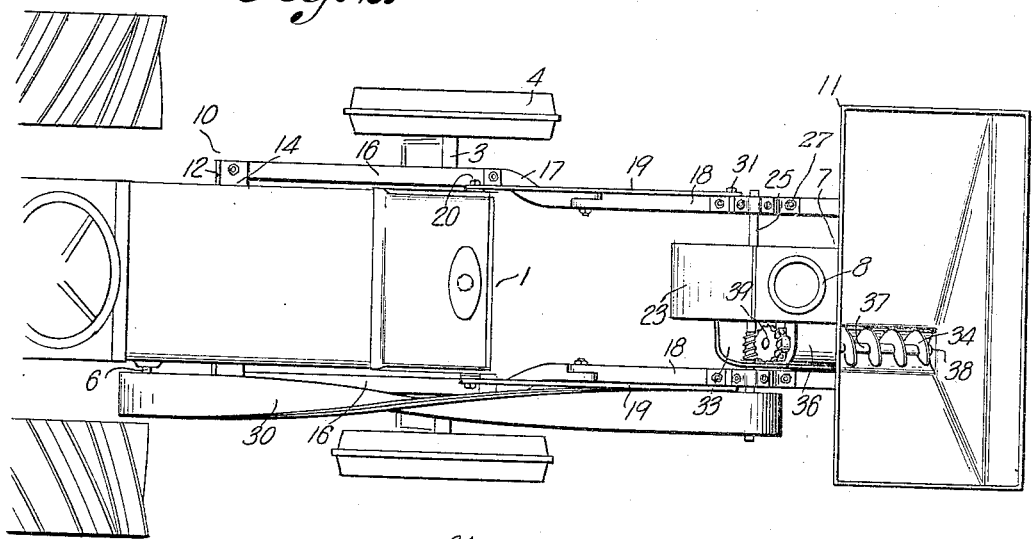
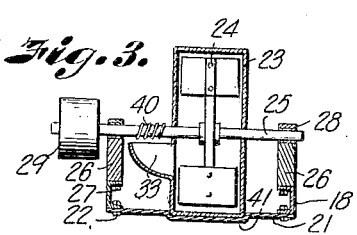
INVENTOR
Halbert C. Wallace
BY
Arthur L. Brown
ATTORNEY Patented Aug. 16, 1932

1,871,930

UNITED STATES PATENT OFFICE

HALBERT C. WALLACE, OF FARGO, NORTH DAKOTA

TRACTOR MOUNTING FOR GRAIN BLOWERS

Application filed May 13, 1929. Serial No. 362,646.

My invention relates to grain handling apparatus, and more particularly to devices including a blower and a tractor for transferring threshed grain from one container to another, the principal objects of the invention being to facilitate transfer of grain from wagons and trucks to a railroad car or granary, and to assure alignment of a blower shaft with a blower actuating pulley on the tractor.

In transferring grain from wagons or trucks to receivers such as railroad cars, available ground space adjacent a car is sometimes insufficient to permit a grain elevating apparatus to be positioned between a grain-carrying vehicle and the car for transferring the grain. A particular object of the invention therefore is to adapt grain-transferring apparatus for positioning in alignment with a truck or wagon and to receive grain therefrom in such position whereby the apparatus may be employed where the space to receive the vehicle and apparatus is relatively narrow.

Further objects of the invention are to support a blower pivotally from a tractor frame whereby the blower may be elevated and tilted for transporting the blower, to adapt the blower to receive grain from a container having a relatively low outlet, and to enable blower-actuating mechanism to operate means for delivering grain to the blower.

In accomplishing these and other objects of the invention, I have provided improved details of structure, the preferred forms of which are illustrated in the accompanying drawing, wherein:

Fig. 1 is a side elevation of grain transferring apparatus embodying my invention and including a portion of a tractor, a blower-actuating belt being broken away to show a member of the blower support, and a front axle being shown in cross section.

Fig. 2 is a plan view of the tractor portion, blower and supporting and operating members.

Fig. 3 is a section on the line 3—3, Fig. 1.

Referring in detail to the drawing:

1 designates a tractor including a frame 2 comprising engine and transmission housings and provided with a front axle 3, front wheels 4 and a pulley 5 located at the side of the frame and supported on a shaft 6 for operation by the engine of the tractor as in ordinary tractor construction.

7 designates generally a blower including a delivery conduit 8 having a horizontally extending branch or spout member 9 for discharge of material such as grain, all of which will be further particularly described.

My invention includes a frame generally designated 10 for supporting the blower in front of the tractor and at a relatively low elevation, and a hopper 11 mounted preferably at the front end of the frame 10 for receiving grain from a truck or wagon for delivery to the blower to be transferred to a granary, railroad car or the like.

The frame 10 includes a transverse angle 12 having its vertical flange secured to vertical frame portions 13 of the tractor frame and a transverse horizontal flange 14 depending from the tractor frame, and vertical brackets or legs 15 secured to the tractor frame at the front end thereof and depending therefrom, for supporting arms 16 extending longitudinally of the tractor below the front axle and forwardly from the tractor for supporting the blower and hopper.

The transverse member 12 projects laterally beyond the tractor frame and the arms 16 therefore extend outside of the tractor but inside of the front wheels, parallel with the longitudinal axis of the tractor, and comprise preferably channel bars having rear ends secured to the transverse angle, intermediate portions bolted to the vertical legs 15, and bent portions 17 inwardly offset in front of the axle. The offset outer ends of the arms are adapted to form hinge members for pivotal connection with swinging bars 18 supported by links 19 adapted to be anchored to the tractor by pins 20 mounted in the tractor frame near the top and at the front end thereof, as presently more particularly described.

A strap-like support 21 having ends secured by bolts 22 to the lower flanges of the channel bars 18 as illustrated in Fig. 3, extends transversely of the blower-supporting bars for supporting a casing portion 23 of the blower containing blades 24 mounted on a blower operating shaft 25. Bearing brackets 26 are mounted on the bars and secured thereto by bolts 27 and have bearing openings 28, for rotatably supporting the blower shaft.

An end of the shaft 25 projects beyond the bearing bracket and a pulley 29 is mounted thereon in suitable position to receive a belt 30 operating on the tractor pulley 5. The blower frame having members fixed to the tractor is adapted to support the blower in fixed relation with the tractor pulley in operating position of the frame as presently described.

The links 19 have lower ends pivotally connected with the bars 18 by pivot pins 31 mounted in said bars adjacent the brackets 26 and preferably within the area of the bars engaged by the brackets and the transverse blower supporting strap 21. The links thus anchored to the tractor frame extend forwardly sufficiently to engage the bars substantially at the point where they receive the weight of the blower and in suitable position for suspendingly supporting the blower frame when the bars are pivoted on the fixed arms. The links are provided with notches 32 adapted to engage the pins 20 for supporting the tilted blower frame when the blower is lifted.

The hopper 11 is mounted in delivering relation with the casing 23 of the blower and is preferably provided with a throat or spout portion 33 having arcuate walls and communicating with the blower casing adjacent the shaft 25 on the side of the casing opposite to the delivery conduit 8 for conducting and directing grain into the blower adjacent the axis thereof, so that the grain gravitates into the blower in the same relative direction as the rotation of the fan, and is gradually picked up thereby without injuring the grain.

The hopper may be positioned for gravity delivery of grain therefrom into the blower but I preferably provide conveying means, such as a spiral or screw 34 operating in a semi-cylindrical recess or bottom portion of the hopper and adapted to move grain from the hopper through a neck-line conduit 36 and the curved diverting throat 33 into the blower.

The screw is formed on a shaft 37 having its lower or outer end rotatably positioned in a wall of the hopper recess as at 38 and its upper end extending through the conduit 36 and provided with a worm gear 39 meshed with a worm 40 provided on the shaft 25, whereby the tractor-operated shaft may operate the conveyor screw.

The throat-like spout portion 33 of the hopper may be formed integrally with the blower casing 23 as illustrated in Fig. 3, and I preferably indent the supporting strap 21 to form a recess 41 in which the blower casing is seated.

In using apparatus constructed and assembled as described, the blower frame may be moved pivotally and latched by engaging the notched portions of the links with the supporting pins 20 for supporting the blower in elevated position during transportation of the same to a location where grain is to be transferred.

The truck or wagon containing grain may be positioned alongside a railroad car on a relatively narrow grade and the tractor may be driven alongside the cars in alignment with the wagon, and moved to position the hopper in receiving relation with the truck. The suspended blower frame permits the hopper to be positioned suitably to receive the grain and the conveying mechanism provides for lifting the grain the relatively short distance from the bottom of the hopper into the blower which then elevates the grain and discharges it into the car.

Attention is called to the fact that the blower is supported forwardly from the tractor at a relatively low elevation. The hopper is adapted to be positioned substantially at the ground level but sufficiently high for clearance so that the tractor may be moved back and forth to admit loaded wagons into position for transfer of grain to the car. The fixed arms of the blower frame and supporting link assure proper spacing and alignment of the tractor and blower pulleys for efficient operation of the belt regardless of the irregularities of the ground on which the tractor may be positioned.

What I claim and desire to secure by Letters Patent is:

1. In apparatus of the character described including a tractor having a frame, a front axle, and actuating mechanism, and a grain blower, a pair of channels suspended from the tractor frame, and extending beneath said front axle forwardly from the frame, a pair of bars pivoted to said channels for supporting the blower in front of the tractor, means including arms pivoted to the bars in front of the axle and adapted to be connected with the tractor for supporting the bars in raised or lowered position, and means including a hopper having an inclined bottom and having a conveyor in said bottom supported by the bars for delivering grain to the blower.

2. In apparatus of the character described including a tractor having a frame, a front axle, and actuating mechanism, and a grain blower including a casing, a pair of channels suspended from the tractor frame and fixed thereto and below the axle, a pair of bars pivoted at one end to said channels and extending forwardly from the frame for supporting the blower in front of the tractor, means including arms having openings therein pivoted to the bars and adapted to be connected with the tractor for supporting the bars in lowered and elevated position, a hopper having an upwardly and rearwardly inclined bottom supported by the bars and having an upwardly inclined conduit communicating with the blower casing, a conveyor located in said hopper and spout and at right angles to the shaft of the blower, and means on the blower shaft and the conveyor for operating said conveyor, thereby delivering grain to the blower.

3. In apparatus of the character described including a tractor having an engine, and a frame supported by the tractor, a blower supported by the frame including a casing having a side inlet and a shaft operable by the tractor engine and provided with a worm, a hopper supported by said frame, a conduit including a spout portion integral with the blower casing for delivering material from the hopper into the casing inlet, and a conveyor in said conduit including a shaft having a worm gear meshed with said worm.

4. In apparatus of the character described including a support, an engine on the support, and a supplemental frame extending longitudinally from one end of the support, a blower mounted on said frame including a casing having a side inlet and a shaft provided with a worm, a hopper mounted on the frame having a conduit for movement of material from the hopper to said side inlet of the blower casing, and a screw in said conduit including a shaft having a worm gear meshed with said worm.

5. In a tractor mounting for grain blowers, supporting arms on opposite sides of the tractor in parallel relation with the longitudinal axis of the tractor and projecting forwardly thereof, means for rigidly securing said arms to the tractor frame at a point below the front axle of the tractor, a blower support hingedly connected to the forward ends of said arms, a blower mounted on the support, a fan in the blower, and a transverse shaft carrying the fan and rotatably mounted on the support.

6. In a tractor mounting for grain blowers, longitudinal supporting arms secured to opposite sides of the tractor frame and including inwardly offset ends projecting forwardly of the tractor, a blower support hingedly connected to the offset forward ends of said arms, a blower mounted on the support, a fan in the blower, and a transverse shaft carrying the fan and rotatably mounted on the support.

In testimony whereof I affix my signature.

HALBERT C. WALLACE.